Owen H. Huston
INVENTOR.

ATTORNEY

United States Patent Office 3,510,757
Patented May 5, 1970

3,510,757
FORMATION DIP MEASURING METHODS AND APPARATUS USING INDUCTION COILS
Owen H. Huston, Houston, Tex., assignor to Schlumberger Technology Corporation, Houston, Tex., a corporation of Texas
Filed Sept. 1, 1966, Ser. No. 576,622
Int. Cl. G01v 3/10
U.S. Cl. 324—6                                    22 Claims

ABSTRACT OF THE DISCLOSURE

In accordance with illustrative embodiments of the present invention, an induction coil array having two receiver coils located between two coaxial transmitter coils is moved through a borehole. The receiver coils are mutually perpendicular with each other and the transmitter coils so that only the secondary current set up by the transmitter coils in dipping formation bedding planes or fractures will cause voltage components to be induced into the receiver coils. By placing a transmitter coil on each side of the receiver coils, the effect of currents in the borehole on the receiver coils is substantially reduced. To provide a measure of the dip angle, the signals induced in the receiver coils are combined to produce one output signal. Both the peak amplitude and elapsed depth interval over which the amplitude of this output signal is greater than a predetermined amplitude level are measured to enable a determination of the dip angle.

---

This invention relates to the determination of certain characteristics of subsurface earth formations by means of an induction coil array which is supported by a central support member adapted to move through a borehole.

More particularly, the invention relates to methods and apparatus for determining the presence of formations in the earth whose angles of dip are other than parallel or perpendicular to the axis of the borehole, and determining the azimuth and dip angle of those earth formations. The invention has special utility in determining the presence of those formations in the earth known as fractures, and the azimuth and angle of dip of these fractures.

In an induction coil system, an array of coils comprising coils of wire attached to a support member is attached to a cable and adapted to be raised and lowered in the borehole. A current is supplied to a transmitting coil system which comprises one or more coils, for setting up a flux field which in turn induces secondary current loops adjacent the support member. The axis of the transmitting coil system is considered to be coaxial with the central support member in this case. These secondary current loops in turn sets up a secondary flux field which induces a current in a receiving coil system, which system may comprise one or more coils. The magnitude of the secondary current, and thus the magnitude of the secondary flux field, is proportional to the conductivity of the medium through which the secondary current travels. The transmitting coil system tends to induce the secondary current in loops which are concentric with the transmitting coil system.

However, there are conditions in the earth formations which may cause the average plane of these secondary current loops to vary from a concentric alignment. Some of these conditions are bedding planes which are not transverse to the axis of the central support member (if there is anisotropy present), junctions between two bedding planes which have angles that are different from this transverse plane (assuming that there is a resistivity contrast between the two bedding planes at the junction), and fractures whose internal resistivities are different from the resistivity of the bedding plane in which the fracture lies. Induction coil systems for determining the dip of earth formations and the azimuth of that dip are shown in U.S. Pat. No. 3,014,177 granted to E. T. Hungerford et al. on Dec. 19, 1961 and U.S. Pat. No. 3,187,252 granted to E. T. Hungerford on June 1, 1965. In these prior art systems, a receiver coil is aligned perpendicular with respect to a transmitting coil so that the receiving coil will only be sensitive to earth formations which are other than transverse with the axis of the central support member (and thus the borehole, assuming that the support member is aligned in the same direction as the borehole).

However, the prior art systems have required means for rotating the coil array to find the desired information. This means for rotating the coil array required elaborate and bulky mechanical equipment for rotating the coil array, and also for keeping track of the azimuth of the coil array as it rotated. This rotation of the coil system causes error signals to be generated into the receiving coils, which must be corrected.

Additionally, in prior art systems, there is a problem of obtaining erroneous results due to noncentering of the support member, which contains the coil array, in the borehole. The reason for this is that the mud contained within the borehole usually has a different resistivity than the resistivity of the adjoining earth formations, the mud column resistivity usually being less than the adjoining earth formation resistivity. Thus, there are usually large secondary currents which circulate in the borehole. As long as the support member remains centered in the borehole, these circulating secondary currents will not induce a signal into the receiving coil system since the receiving coil system is aligned perpendicular with the transmitting coil system. However, when the support member becomes eccentered in the borehole, the net value of flux set up by the secondary currents will pass through the receiving coil system at angles other than perpendicular to the axis of the receiving coil system, and thus a signal will be induced into the receiving coil system. Since this signal due to eccentering occurs whether or not there is a dip in the earth formations, it would be interpreted as an indication of earth formation dip, and thus would be in error. Additionally, erroneous results can be obtained from the receiving coil not being aligned exactly perpendicular with the transmitting coil.

It is not uncommon for the mud contained within the borehole to filter out into the earth formations immediately adjoining the borehole, thus altering the resistivity of these invaded earth formations. It may sometimes happen that this invaded zone is not concentric with the borehole. In this nonconcentric invaded zone case, there will be an error signal induced into the receiving coil system for the same reasons as when the support member is eccentered in the borehole.

Previously, the angle of dip of the earth formations has been determined by the magnitude of the signals picked up by the receiving coil system on the theory that the amplitude of the signal induced into the receiving coil system will vary as the dip angle of the adjacent earth formation varies. However, there are factors which cause inaccurate results when using the magnitude of the received signal alone. For example, the magnitude of the signal induced into the receiving coil system is also dependent on the conductivity of the adjoining earth formations. Thus, in the case of a junction between bedding planes, the magnitude of the secondary current flow and thus the magnitude of the received signal, is dependent on the resistivity contrast between the two adjacent bedding planes.

In the case of a fracture, the secondary current flow, and thus the received signal in the receiving coil system, is somewhat dependent on the type of fluid present in the fracture and the thickness of the fracture. Thus, different fractures having the same angle of dip will provide widely varying magnitudes of received signal in accordance with the thickness of the fracture and the resistivity of the fluid in the fracture, and thus the apparatus would indicate widely varying dip angles even if the dip angle were to always be the same. Additionally, the variation of received signal magnitude with angle of dip of the adjacent earth formation is not an ever increasing function, but instead, rises until the dip angle is at a given angle, and then, begins decreasing. Thus, it can be seen that the same amplitude of received signal could indicate two possible dip angles.

It is an object of the invention therefore to provide new and improved methods and apparatus for investigating subsurface earth formations.

It is another object of the invention to provide new and improved methods and apparatus for providing information relating to dipping earth formations.

In accordance with one feature of the present invention, apparatus for investigating earth formations traversed by a borehole comprises a support member adapted for movement through the borehole and having a coil array mounted thereon, the coil array including at least one transmitting coil and two receiving coils, said two receiving coils aligned at different angles to each other and perpendicular to said at least one transmitting coil. The apparatus further comprises means for supplying current to said at least one transmitting coil for inducing secondary current flow in the earth formations, the receiving coils adapted to be responsive to the secondary current flow and means coupled to the receiving coils for providing output signals representative of the response of the two coils to the secondary current flow. These two output signals are then combined to produce a signal which is representative of formation dip.

In accordance with another feature of the invention, apparatus for investigating earth formations traversed by a borehole comprises a support member adapted for movement through the borehole having a coil array mounted thereon, the coil array including at least two transmitting coils aligned along the same axis and at least one receiving coil aligned perpendicular to the axis of said at least two transmitting coils, at least one transmitting coil located on either side of said at least one receiving coil. The apparatus further includes means for supplying current to said at least two transmitting coils for inducing secondary current flow in the earth formations, said at least one receiving coil adapted to be responsive to the secondary current flow and means coupled to said at least one receiving coil for providing an indication of a characteristic of the earth formations.

In accordance with still another feature of the invention, apparatus for investigating earth formations traversed by a borehole comprises a support member adapted for movement through the borehole and having a coil array mounted thereon, the coil array including at least one transmitting coil and at least one receiving coil whose axis is aligned perpendicular to the axis of said at least one transmitting coil. The apparatus further comprises means for supplying current to said at least one transmitting coil for inducing secondary current flow in the earth formations, said at least one receiving coil adapted to be responsive to the secondary current flow. The apparatus also comprises means coupled to said at least one receiving coil for providing an output signal indicative of the secondary current flow and means for measuring the elapsed depth interval which the output signal is above a specified amplitude for providing an indication of the dip of the earth formations.

In accordance with yet another feature of the invention, a method of investigating earth formations traversed by a borehole comprises moving a support member having a coil array mounted thereon through the borehole, the coil array including at least one transmitting coil and at least one receiving coil whose axis is aligned perpendicular to the axis of said at least one transmitting coil. The method further comprises supplying current to said at least one transmitting coil for inducing secondary current flow in the earth formations, said at least one receiving coil adapted to be responsive to the secondary current flow. The method also comprises generating an output signal indicative of the secondary current flow in response to the signal induced into said at least one receiving coil and measuring the elapsed depth interval which the output signal is above a given amplitude to enable a determination of formation dip.

For a better understanding of the present invention, together with other and further objects thereof, reference is had to the following description taken in connection with the accompanying drawings, the scope of the invention being pointed out in the appended claims.

Referring to the drawings.

Figure 1:
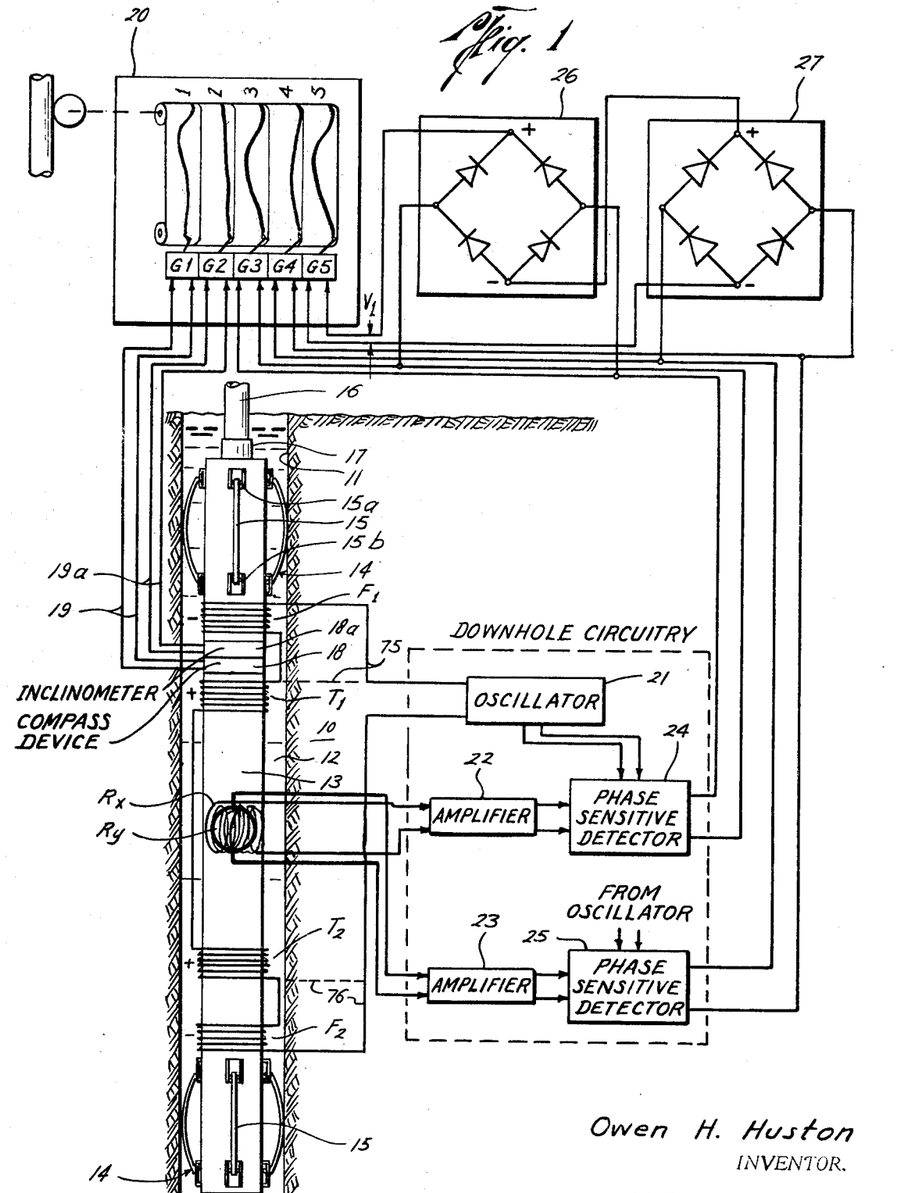
FIG. 1 illustrates one embodiment of a focused electrode tool in the borehole along with a schematic representation of the electrical circuitry utilized in connection with the present invention.

Referring to FIG. 1 of the drawings, there is shown a representative embodiment of apparatus constructed in accordance with the present invention for investigating subsurface earth formations 10 traversed by a borehole 11. Borehole 11 is filled with a conductive drilling fluid or drilling mud 12. The borehole investigating apparatus includes an elongated cylindrical support member 13 to which is secured an array of coils. Secured near the upper end of the support member 13 is an upper transmitting coil $T_1$. The direction in which transmitting coil $T_1$ is wound will be considered as the positive polarity. Secured to the lower end of cylindrical support member 13 is a second transmitting coil $T_2$, also of positive polarity. Both transmitting coils $T_1$ and $T_2$ are aligned coaxially with central support member 13. Located just above the upper transmitting coil $T_1$ is an upper focusing coil $F_1$ and located just below the transmitting coil $T_2$ is a lower focusing coil $F_2$, both aligned coaxially with transmitting coils $T_1$ and $T_2$. Both focusing coils $F_1$ and $F_2$ are wound in the opposite directions from transmitting coils $T_1$ and $T_2$ and thus have a negative polarity. Transmitting coil $T_1$ desirably has the same number of turns as transmitting coil $T_2$. Likewise, focusing coil $F_1$ desirably has the same number of turns as focusing coil $F_2$, but not necessarily the same number of turns as transmitting coils $T_1$ and $T_2$. Focusing coils $F_1$ and $F_2$ are desirably located equal distances from transmitting coil $T_1$ and $T_2$ respectively, although this is not essential.

Located intermediate of transmitting coils $T_1$ and $T_2$ and an equal distance therebetween are a pair of receiving coils $R_x$ and $R_y$. Receiving coils $R_x$ and $R_y$ are positioned perpendicular with respect to each other and perpendicular with respect to the transmitting and focusing coils $T_1$, $T_2$, $F_1$ and $F_2$. The axis of transmitting and focusing coils $T_1$, $T_2$ $F_1$ and $F_2$, which passes through the center of support member 13, also passes through the center point of receiving coils $R_x$ and $R_y$. That is, receiving coils $R_x$ and $R_y$ extend equal distances horizontally (transverse to support member 13) from this center axis of the support member 13. The transmitting, focusing and receiving coils may all have the same coil diameter or they may have different diameters depending on the available room in the support member 13 and the desired response.

Located above upper focusing coil $F_1$ and below lower focusing coil $F_2$ is a centralizing means 14. Centralizing means 14 has a plurality of bowed springs 15 spaced at different circumferential points around the support member 13. The ends of the bowed springs 15 are slidably mounted in hollow boxes 15a which are fixedly attached to support member 13. The hollow boxes 15a have an elongated opening on the face portions thereof facing away from the center axis of support means 13. The ends of the bowed springs 15 pass through the longitudinal opening in hollow boxes 15a and are attached to a member 15b within the hollow boxes 15a having a larger diameter than the longitudinal opening. Thus, it can be seen that the ends of bowed springs 15 are adapted to slide in the hollow boxes 15a, thus providing sufficient flexibility of centralizing means 14 to maintain central support member 13 centered in the borehole for various borehole diameters.

Desirably, centralizing means 14 is made of a nonmagnetic, nonconductive material of sufficient rigidity, so as to prevent coupling with the coils, although the centralizing means could be made of a metallic substance if spaced far enough away from the coils. Also, if desired, the centralizing means 14 could be located in midst of the coils if made of a nonmagnetic, nonconductive material. This centralizing means shown in FIG. 1 is only exemplary, and any other type of centralizer means could be used, such as that shown in U.S. Pat. No. 3,196,951 granted to D. F. Saurenman on July 27, 1965.

The central support member 13 is supported in the borehole by an armored multiconductor cable 16 which passes to the surface of the earth. The cable 16 is reeled in and out of the borehole by means of a suitable drum and winch mechanism (not shown). Support member 13 is extended upwardly beyond the upper focusing coil $F_1$ to provide room for the electrical circuitry housing portion. The conductors which connect the downhole electrical circuitry to the surface of the earth travel through armored multiconductor cable 16, but are shown passing outside thereof for purposes of clarity. Located between upper transmitting coil $T_1$ and upper focusing coil $F_1$ are a compass device 18 of suitable design, as for example, a flux gate device for providing information concerning the azimuthal orientation of the receiving coils $R_x$ and $R_y$ and an inclinometer device 18a, of standard design, for providing information as to the deviation of central support member 13 with respect to the gravitational axis. A conductor pair 19 connects the compass device 18 to galvanometer G1 of a recorder 20 at the surface of the earth and a conductor 19a connects the output of inclinometer device 18a to the galvanometer G2 of recorder 20.

Now concerning the electrical circuitry associated with the present invention, an oscillator 21 supplies current to transmitting coils $T_1$ and $T_2$ and focusing coils $F_1$ and $F_2$, which coils are connected in series with the oscillator 21. The input to an amplifier 22 is connected across the receiving coil $R_x$ and the input to an amplifier 23 is connected across the receiving coil $R_y$. The output from amplifier 22 is connected to the input of a phase-sensitive detector 24, to which also is supplied a phase-reference signal from oscillator 21. The output from amplifier 23 is connected to the input of phase-sensitive detector 25, to which also is supplied a phase-reference signal from oscillator 21. The output from the phase-sensitive detector circuit 24 is supplied to the surface of the earth via cable 16 and connected to a galvanometer G3 within recorder 20 and across a full-wave rectifier circuit 26. The output from phase-sensitive detector 25 is supplied to the surface of the earth via cable 16 and connected to a galvanometer G4 within recorder 20 and across a full-wave rectifier circuit 27.

The full-wave rectifier circuits 26 and 27 are connected in such a way that the magnitude of the output signals from phase-sensitive detectors 24 and 25 will always be added together and of a positive polarity. Thus, the positive output terminal from full-wave rectifier 27 is connected to the negative output terminal of full-wave rectifier 26. The positive terminal of full-wave rectifier 26 and the negative terminal of full-wave rectifier 27 are connected to a galvanometer G5 within recorder 20.

Now concerning the operation of the apparatus of FIG. 1, the oscillator 21 supplies a constant current, alternating-current signal to transmitting coils $T_1$ and $T_2$ and focusing coils $F_1$ and $F_2$. The transmitting coils $T_1$ and $T_2$ are connected in a series aiding relationship such that the secondary currents induced adjacent the central support member by transmitting coil $T_1$ will be in the same direction (positive polarity) as the secondary current induced by transmitting coil $T_2$. Focusing coils $F_1$ and $F_2$ have a negative polarity so as to focus the secondary currents set up by transmitting coils $T_1$ and $T_2$ in an outward direction, thus providing greater sensitivity over a relatively narrow vertical region. (Vertical is defined as the direction parallel to the borehole axis.) That is to say, most of the secondary current will be confined to a relatively narrow vertical region.

This secondary current sets up a secondary flux field, which under certain conditions to be described later, will induce a current in receiving coils $R_x$ and $R_y$. The signal induced into receiving coil $R_x$ is amplified by amplifier 22 and that portion thereof which is in-phase with the oscillator 21 signal is detected by phase-sensitive detector 24. Detector 24 applies a DC output signal to recorder 20 which is proportional to that portion of the received signal in coil $R_x$ which is in-phase or 180° out of phase with the current in the transmitting coils. Likewise, the signal picked up in receiver coil $R_y$ is amplified by amplifier 23 and a DC output signal proportional to that portion of the received signal in coil $R_y$ which is in-phase or 180° out of phase with the oscillator current is supplied from phase-sensitive detector 25 to recorder 20. Full-wave rectifiers 26 and 27 provide an output signal to recorder 20 which signal is proportional to the sum of the ouput signals from rectifiers 26 and 27 regardless of the polarity of the signals from phase-sensitive detectors 24 and 25.

The receiver coils $R_x$ and $R_y$ will not be sensitive to earth formations which are perpendicular to the axis of the support member 13 (horizontal earth formations), nor will the receiver coils be sensitive to the eccentering of the support member 13 in the borehole. Likewise, the receiver coils will not be sensitive to invaded zones which are nonconcentric with the axis of support member 13. However, the receiver coils will be sensitive to earth formations which are not perpendicular or parallel to the axis of support member 13, which of course, is the information desired.

Figures 2, 3:
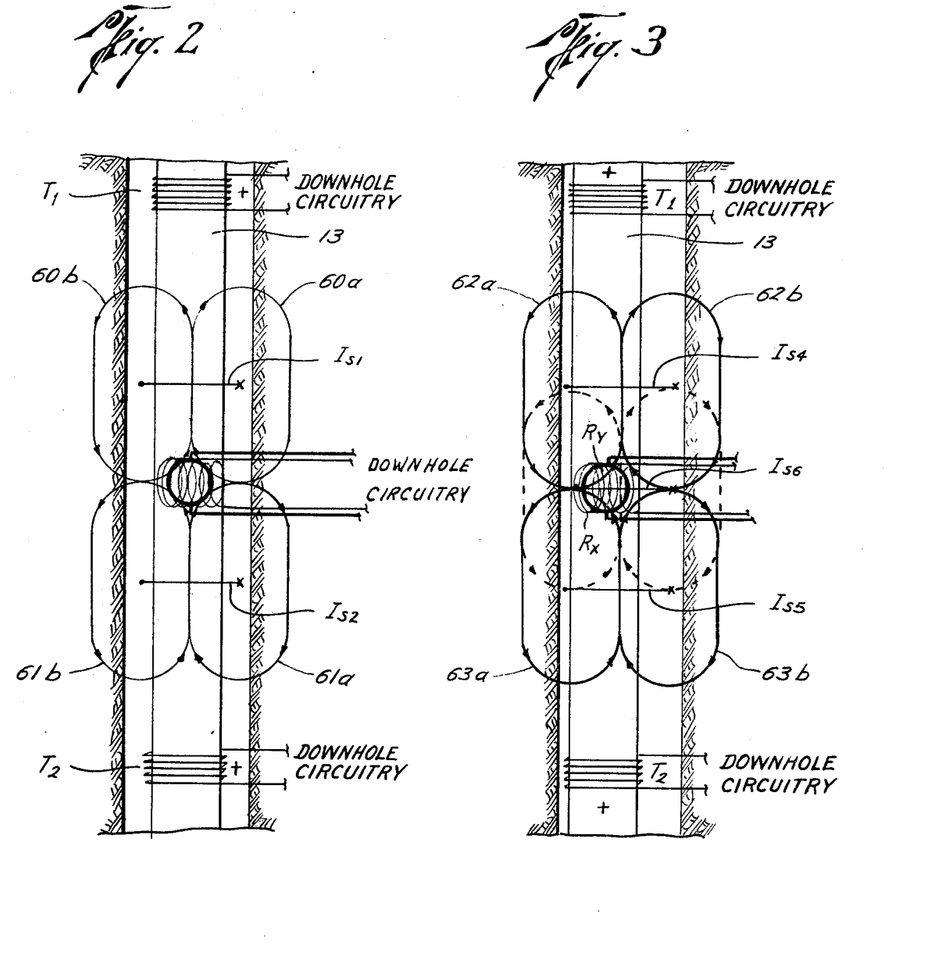
FIGS. 2, 3, and 4 are illustrations of an induction coil device placed in the borehole for purposes of explanation of the theory of the present invention.
Figure 4:
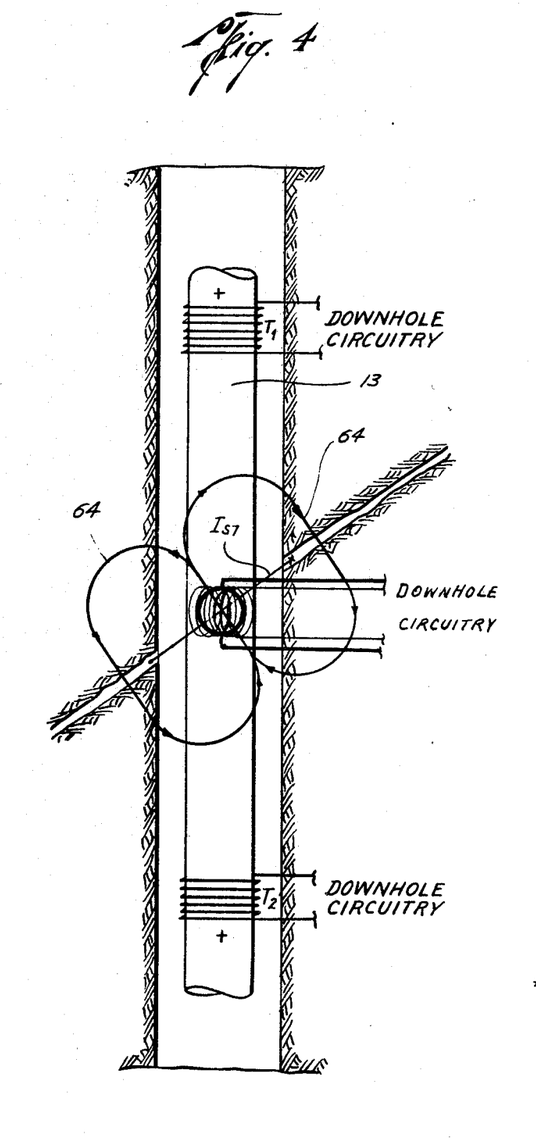

To better understand how the coil system of FIG. 1 accomplishes these functions, refer to FIGS. 2, 3 and 4. Looking first at FIG. 2, there is shown a portion of the support member 13 with only the transmitting and receiving coils present in a borehole. It is assumed that there is concentric symmetry with respect to support member 13. The flux set up by transmitting coil $T_1$ will induce secondary currents adjacent the support member 13 as, for example, the secondary current loop $I_{s1}$. The $x$ signifies that the current is going into the paper at that point, and the dot signifies that the current is coming out of the paper at that point. This secondary current loop will set up secondary flux loops, as the flux loop 60. In like fashion, transmitting coil $T_2$ will set up secondary current loops such as, for example, the secondary current loop designated $I_{s2}$. This secondary current loop $I_{s2}$ will set up secondary flux loops as shown, designated 61. Secondary current loops $I_{s1}$ and $I_{s2}$ will both have the same polarity since transmitting coils $T_1$ and $T_2$ have the same polarity, and thus, flux loops 60 and 61 will have the same polarity.

If there are no dissymmetries in the earth formations which cause the secondary current loops to be tilted from the horizontal position shown in FIG. 2, the great majority of flux lines will be transverse to the receiving coils $R_x$ and $R_y$, and thus very little current will be induced into the receiving coils. This is true even where a horizontal fracture or junction between bedding planes is present. Some of the secondary flux loops set up by secondary currents in such a horizontal fracture or junction between bedding planes will have a horizontal portion at the receiving coils as shown by the flux loops 60a, 60b, 61a and 61b when the fracture or junction is vertically above or below the receiving coils. However, the sum of these horizontal components of flux will be zero, e.g., flux loops 60a and 60b are in opposite directions at the receiving coils. Thus, assume that the secondary current loop $I_{s1}$ is in a fracture, which means that the secondary current loop $I_{s1}$ is of greater magnitude than any other secondary current loop, then the secondary flux lines 60a and 60b set up by the secondary current loop $I_{s1}$ will cancel each other out. The same is true if the horizontal fracture is present at $I_{s2}$ or any other location. Likewise, the same theory holds true for secondary current circulating through the mud in the borehole.

Looking now at FIG. 3, there is shown the situation where the support member 13 is eccentered in the borehole. In this case, the secondary current loops circulating in the borehole, designated $I_{s4}$, $I_{s5}$ and $I_{s6}$ will likewise be off-centered with respect to the axis of the support member 13 since the mud resistivity is generally different from that of the earth formations. Likewise, the secondary current loop will be off-centered with respect to the support member 13 if the invaded zone is nonconcentric with respect to the support member 13. Since the mud resistivity is usually less than the earth formation resistivity, these borehole currents will be substantial. It can be seen that the secondary flux loop 62a set up by the secondary current $I_{s4}$ will pass through the receiving coil system in a nonvertical direction so as to induce current into the receiving coils, in this case $R_x$. However, there is an equal and opposite flux loop present at the receiving coils set up by the secondary current loop $I_{s5}$, designated 63a which cancels the flux loop 62a linking the receiving coil. This situation will hold true for all of the secondary current loops on either side of the receiving coil system so long as the resistivity is uniform for a certain vertical distance above and below the receiving coils. Since the focusing coils of FIG. 1 cause a relatively narrow vertical sensitivity, the resistivity only need be constant for a relatively short range. Even if the resistivity of the surrounding earth formations is not uniform above and below the receiving coils, the fact that the flux loops set up by the secondary current on one side of the receiving coils will tend to cancel that set up by the secondary current on the other side of the receiving coils will tend to substantially reduce any error signal induced into the receiving coils. Of course, when the support member 13 is centered in the borehole, the affect of the resistivity not being constant on both sides of the receiving coils will be insignificant. The secondary current loop $I_{s6}$ which is on the same vertical level as the receiving coils produces secondary flux loops which pass through the receiving coils in a perpendicular direction, thus causing no induced current in the receiving coils. Thus, it can be seen that with the coil system of FIG. 1, the coil system will be insensitive to horizontal earth formations, including situations where the support member 13 is eccentered in the borehole.

Now looking at FIG. 4, there is shown the situation where the borehole passes through a fracture. Most of the fractures of interest occur in limestone, which has a very high resistivity. For all practical purposes, the resistivity of limestone can be considered as infinite. Since a fracture is a narrow recess in the formation, fluids will usually be present in the fracture. This fluid will almost always have a lower resistivity than that of the adjoining limestone. This is especially true if salt water is present in the fracture, but even if oil is present, there very likely will be thin layers of salt water between the oil and the limestone. Thus, there will be a strong concentration of secondary current present in the fracture.

If the dip of the fracture is at an angle other than horizontal or vertical with the support member 13, there will be a signal induced into the receiving coils. A representative secondary current loop, designated $I_{s7}$ is shown in FIG. 4. This current loop $I_{s7}$ will set up secondary flux loops designated 64 as shown in FIG. 4, which flux lines will tend to pass through the receiving coils at an angle perpendicular to the secondary current loop $I_{s7}$, and thus perpendicular to the fracture. Thus, there will be a current induced in the receiving coils by the secondary flux loop 64. Since the resistivity of limestone is substantially high, any secondary current loops which may be present on either side of the fracture will be substantially horizontal thus contributing little, if any, to the current induced into the receiving coils. For the case of junctions between bedding planes, so long as there is a difference in resistivity between the two adjoining bedding planes, the secondary currents will tend to orient themselves with the junction. Thus, the average plane of the secondary current loops will be tilted so as to be oriented with the junction between the two bedding planes.

Figure 5:
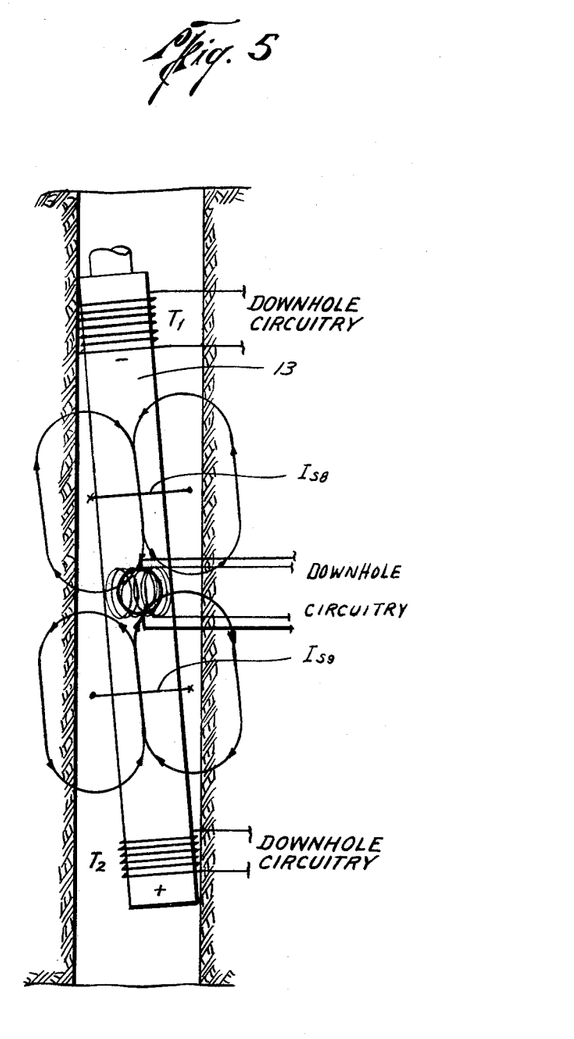
FIG. 5 illustrates another embodiment of the induction coil array with the central support member placed in the borehole in a tilted position.

Looking now at FIG. 5, there is shown another embodiment of the present invention. In the FIG. 5 embodiment, one of the transmitter coils is wound in the opposite direction from the other transmitter coil. In this case, the upper transmitting coil $T_1$ has a negative polarity while the lower transmitting coil $T_2$ has a positive polarity. If focusing coils are utilized, each focusing coil should have the opposite polarity from the adjacent transmitting coil. The remainder of the apparatus of FIG. 5 is identical with the FIG. 1 apparatus.

In the FIG. 5 apparatus, the support member 13 is shown tilted in the borehole. Looking at the representative secondary current loops $I_{s8}$ and $I_{s9}$, they will have opposite polarities as shown, and thus the secondary flux loops generated by each of the secondary current loops $I_{s8}$ and $I_{s9}$ will have opposite polarities. It can be seen from FIG. 5 that the secondary flux loops generated by each of the secondary current loops will subtract at the receiver coils. The same thing applies to the remainder of the secondary current loops. Thus, it can be seen that when the support member 13 is tilted in the borehole, there will be no signal induced into the receiving coils from the secondary current circulating in the borehole. However, if the support member 13 is eccentered in the borehole, a signal would be induced into the receiving coils from the borehole current. Likewise, when the support member 13 is in the tilted position of FIG. 5 and the transmitting coils are in the aiding relationship shown in FIG. 1, the secondary flux lines would add at the receiving coils.

Figures 6, 7:
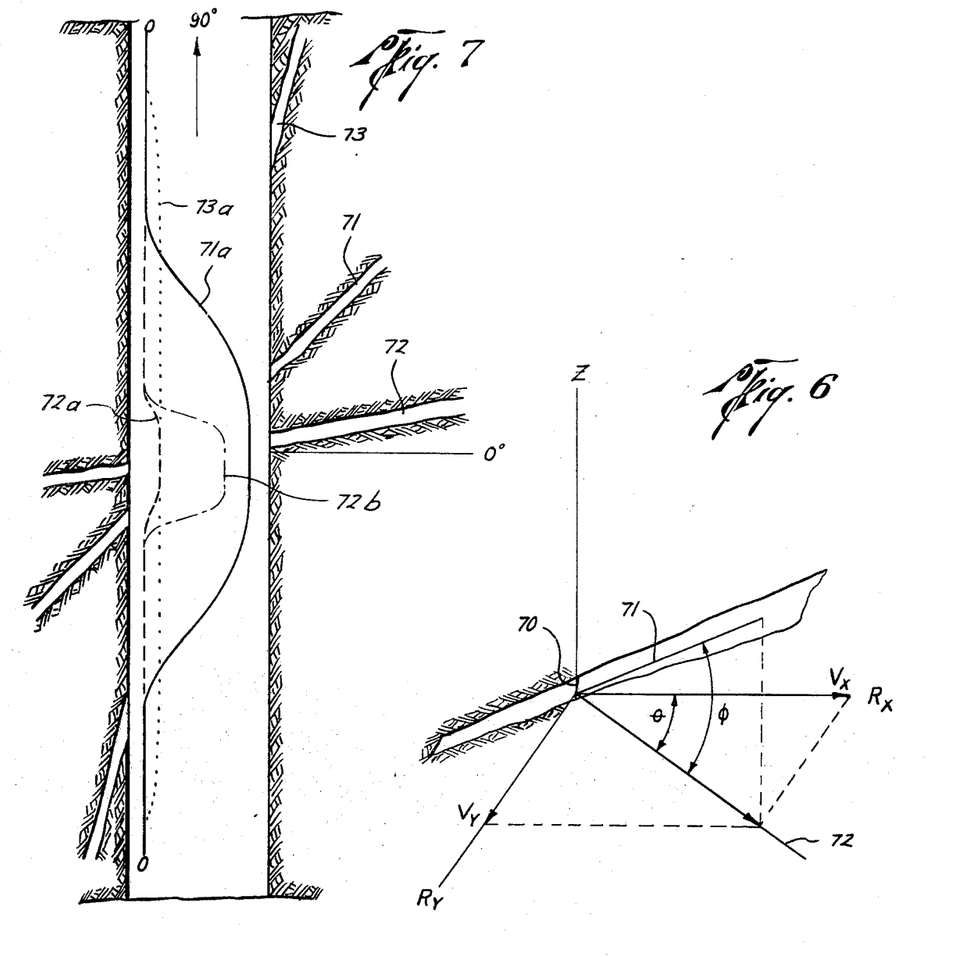
FIG. 6 is a three dimensional representation of the orientation of an induction coil device to a dipping earth formation, for purposes of explanation of the theory of operation of the present invention.
FIG. 7 illustrates a borehole traversing a plurality of dipping earth formations, along with a plot of the electrical signals obtained at a point in the FIG. 1 circuitry when investigating different configurations of earth formations.

Looking now at FIG. 6, there is shown a three-axis representation of a dipping earth formation with respect to the axis of the support member for the purpose of defining the dip angle and azimuth. The dipping earth formation is shown as a segment of a plane, although the plane would normally extend outwardly a great distance. The support member axis is designated as the z axis in FIG. 6. The $R_x$ and $R_y$ axes represent the axis of the receiver coils $R_x$ and $R_y$ respectively of FIG. 1. A line 70 is drawn coincident with the plane making up the $R_x$ and $R_y$ axis, and the dipping earth formation plane. If now, a line 71 is drawn on the dipping earth formation plane perpendicular to the line 70, this line 71 designates what is commonly referred to as the strike of the dipping earth formation. If the line 71 is projected down onto the $R_x$, $R_y$ plane, a line 72 will result. The angle $\phi$ between the lines 71 and 72 is the angle of dip of the dipping earth formation with respect to the support member horizontal.

To determine the azimuth of the dipping earth formation, the position of line 72 with respect to a compass position must be known. The compass device 18 shown in FIG. 1 provides the information as to the orientation of the receiver coils $R_x$ and $R_y$. Thus, by knowing the angle between a fixed direction of support means 13, such as the axis of one of the receiver coils, and a given compass direction, the azimuth can be readily determined. The angle of line 72 with respect to the receiving coil $R_x$, for example, designated $\theta$, can readily be determined by knowing the magnitude and polarity of the signals received in receiver coils $R_x$ and $R_y$, designated $V_x$ and $V_y$.

Additionally, to complete the pitcure, it would be desirable to know the deviation of the borehole from the gravitational direction. To determine this angle of deviation, a standard inclinometer device, designated 18a, is mounted in the tool and provides a signal to galvanometer G2 of recorder 20 proportional to the angle of deviation from the gravitational axis. Thus, to determine the angle of dip with reference to the gravitational axis, the angle of deviation and the angle of dip with respect to the support member must both be known.

Before proceeding with the explanation of the operation of the apparatus of FIG. 1, it would be desirable at this time to look at the type of signal that can be expected from the output of full-wave rectifiers 26 and 27, designated $V_1$, when a dipping earth formation is transgressed. Referring to FIG. 7, the dipping earth formations are shown as fractures 71, 72 and 73. It has been found that a signal such as shown by solid line 71a will be obtained when passing a fracture such as the fracture 71. The output $V_1$ from full-wave rectifiers 26 and 27 will increase until it reaches a constant level and remain at that level for a given period of time and then return to zero as the receiving coils pass the fracture. On the other hand, if the dip of the fracture is more nearly horizontal as shown by the fracture 72, the output signal $V_1$ will be more nearly as shown by the dashed line 72a, i.e., it will have a low peak amplitude and short duration. On the other hand, if there is a fracture which is nearly vertical, such as fracture 73, the output signal $V_1$ will take a form more as shown by dotted line 73a, i.e., it will have a low peak amplitude and a long duration.

Figure 7A:
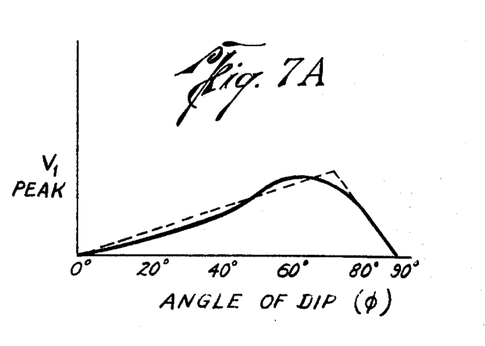
FIG. 7a illustrates a graph useful in explaining the present invention.

Thus, it can be seen that the duration with respect to depth that the output signal $V_1$ is above zero will be progressively greater as the angle of dip increases from 0° toward 90°. On the other hand, the peak amplitude of the output signal $V_1$ is zero at 0° and 90° and becomes progressively greater as the angle of dip increases above 0° and below 90°. This is better illustrated in FIG. 7a where a plot (solid line) of the peak value output signal $V_1$ versus angle of dip with the other factors, such as conductivity, held constant is shown. It can be seen that $V_1$ (peak) will increase with dip angle ($\phi$) to a maximum value and then start decreasing. Thus, the same peak amplitude of $V_1$ could indicate two possible angles of dip. The exact form of the curve of FIG. 7a will depend on such things as spacing between coils and the number of turns of each coil.

Referring back to FIG. 7, there is shown a dash-dot curve 72b which represents the output signal $V_1$ when the fracture 72 has a higher conductivity than was the case with the 72a signal. The signal of 72b may be obtained, for example, when fracture 72 has salt water contained therein or is relatively thick, and the signal 72a may be obtained if fracture 72 predominately contains oil or is relatively thin. It can thus be seen from FIG. 7, that the peak amplitude of the output signal $V_1$ may be very inaccurate in determining the angle of dip $\phi$ of dipping earth formations. A formation having a certain angle of dip can provide highly divergent signal levels as shown by signals 72a and 72b. Likewise, the same signal level may be obtained from fractures having very different angles of dip, as seen by signals 72a and 73a. However, it is to be noted that, for substantially all cases, the duration with respect to depth of the output signal $V_1$ increases as the angle of dip increases. However, the peak amplitude of $V_1$ will somewhat affect the depth duration of $V_1$.

Referring back to FIG. 1, it can be seen that the information recorded by galvanometers G1–G5 of recorder 20 represent sufficient information to determine various parameters of the dipping earth formations. Track 5, corresponding to galvanometer G5, will indicate when a dipping earth formation, such as a dipping fracture, is present. This is accomplished merely by observing whether the galvanometer pen is deflected from zero. The azimuth of that dip with respect to a given direction of the support member can readily be determined by a simple computation from tracks 3 and 4 of recorder 20. That is, the ratio of the signal on track 3 with respect to the signal on track 4 is proportional to the tangent of $\theta$. To determine the azimuth with respect to a given compass direction, the angle $\theta$ is added to the compass angle from compass device 18 recorded on track 1.

To determine the angle of dip with respect to central support member 13, the signal recorded on track 5 is utilized. As set forth in connection wih the explanation of FIG. 7, the depth duration and amplitude of the output signal $V_1$ are indicative of the angle of dip $\phi$. The exact relationship between angle of dip $\phi$, depth duration and amplitude of $V_1$ can be determined by empirical means for the particular investigating apparatus utilized and suitable interpretation charts drawn up to give the angle of dip. To reference the dip angle to the gravitational axis, the angle of deviation on track 2 must be combined with the dip angle $\phi$ found from track 5.

It can thus be seen that by utilizing the apparatus of FIG. 1, an accurate representation of the azimuth and dip of dipping earth formations can be obtained. By utilizing the support member and coil system of FIG. 1, the system is substantially insensitive to concentric dissymmetry since two transmitting coils $T_1$ and $T_2$ are in an aiding relationship. The transmitting coils $T_1$ and $T_2$ could be utilized without the focusing coils $F_1$ and $F_2$, as shown by the dotted lines 75 and 76, which represent the transmitting coils $T_1$ and $T_2$ connected directly to oscillator 21. However, by utilizing focusing coils $F_1$ and $F_2$, a better defined sensitivity to the adjoining earth formations can be obtained. Also, by utilizing the horizontally aligned coils $R_x$ and $R_y$, there is no need for a rotating coil system. Although the coil system of FIG. 1 is sensitive to tilting in the borehole as shown in FIG. 5, the utilization of the centralizing means 14 maintains the central support member 13 in a substantially central position in the borehole. The system of FIG. 1 additionally obtains a more accurate representation of the dip angle of adjoining dipping earth formation by combining the signals induced into receiver coils $R_x$ and $R_y$ in full-wave rectifiers 26 and 27 and utilizing both the peak amplitude and depth duration of the combined signal to determine the dip angle.

Now referring to FIG. 8, there is shown another embodiment of the FIG. 1 apparatus where the various functions regarding dipping earth formations are computed automatically rather than being directly recorded into recorder 20 for later interpretation. The apparatus of FIG. 8 includes the apparatus of FIG. 1 except that a computer 77 has been added between the inputs to recorder 20 and the remaining circuitry of FIG. 1.

The outputs from phase-sensitve detectors 24 and 25, along with being supplied to full-wave rectifiers 26 and 27, are also supplied to the input of a resolver 28, of standard design, the output of which is supplied to recorder 20. Resolver 28 transforms the rectangular coordinate signals from receiving coils $R_x$ and $R_y$ into a polar coordinate signal representative of the angle $\theta$ which the resultant vector makes with a fixed point on the coil array, as for example, the angle with respect to the axis of one of the receiving coils, $R_x$ or $R_y$. To obtain the azimuth with respect to a given compass direction, the recorded readings from compas device 18 are combined with the reading from resolver 28. If desired, this could be accomplished automatically in a summing network.

The output signal $V_1$, from full-wave rectifiers 26 and 27 is supplied to circuit 29 which is adapted to provide a constant output voltage whenever the input voltage $V_1$ attains a desired level. Trigger circuit 29 could comprise, for example, a diode trigger circuit or a Schmitt trigger which provides a "0" or "1" output. The negative output from full-wave rectifier 27 is connected to a common ground. This same common ground is used throughout the surface circuitry, but is not shown on the circuit blocks of FIG. 8.

The positive output from full-wave rectifier 26 is also connected to the anode of a diode 30, the cathode of which is connected to one side of a capacitor 31 and the input to gate circuits 32 and 33, the other side of capacitor 31 and the output from gate 32 being connected to common ground. The output from gate 33 is connected to the input of a differential amplifier 34 and to one input of a ratio circuit 35, the output from differential amplifier 34 is applied to the input of an inhibit gate 36, the output of which is connected through a variable resistor 37 to one side of a resistor 38a and the input to an amplifier 39. The other side of resistor 38a is connected to the common ground. The output from amplifier 39 is supplied to recorder 20.

A rotating wheel 40 is adapted to be engaged with the cable 16 so as to rotate as the cable 16 is moved in or out of the borehole. This mechanical rotation is coupled via shaft 41 to the input of a depth pulse circuit 42 and to drive recorder 20. Depth pulse circuit 42 converts this mechanical rotation of shaft 41 into a series of pulses proportional to the travel of cable 16. Thus, each pulse generated by depth pulse circuit 42 is proportional to a given distance of travel of cable 16. Depth pulse circuit 42 could comprise, for example, a slotted rotating drum with sensing means for counting the number of slots that pass a given point, i.e. the sensing means could be optical, magnetic, etc. This pulse output from depth pulse circuit 42 is supplied to the input of a gate circuit 44.

The output from trigger circuit 29 is connected to the control terminal of gate circuit 44 so that whenever there is an output from trigger circuit 29, gate circuit 44 will open to allow the pulses from pulse circuit 42 to pass through. The output from gate circuit 44 is connected to the input of an integrator 45, of standard design. The output from integrator 45 is connected to the input of a gate circuit 46, the output of which is connected to the other input to ratio circuit 35, and through a variable resistor 38 to the input of amplifier 39 and to resistor 38a.

The output from trigger circuit 29 is also applied to the "set" input of a bistable multivibrator or flip-flop 47. The "1" output from flip-flop 47 is supplied to one input of an AND gate 48, the output from AND gate 48 being applied to the control inputs of gate circuits 46 and 33 and to the input of a delay circuit 49. The output from trigger circuit 29 is also applied to the input of an inverter circuit 50, the output of which is applied to the other input to AND gate 48. The output from delay circuit 49 is applied to the reset input of integrator 45 (which resets integrator 45 to zero) and to the reset input of flip-flop 47. Gate circuits 32, 33, 44 and 46 are standard "enable type" circuits, in which an input on the control terminal thereof will open the gate and allow the applied input to pass to the output thereof. Likewise, a signal applied to the control terminal of inhibit gate 36 will inhibit the applied input signal from passing to the output thereof.

Figure 8:
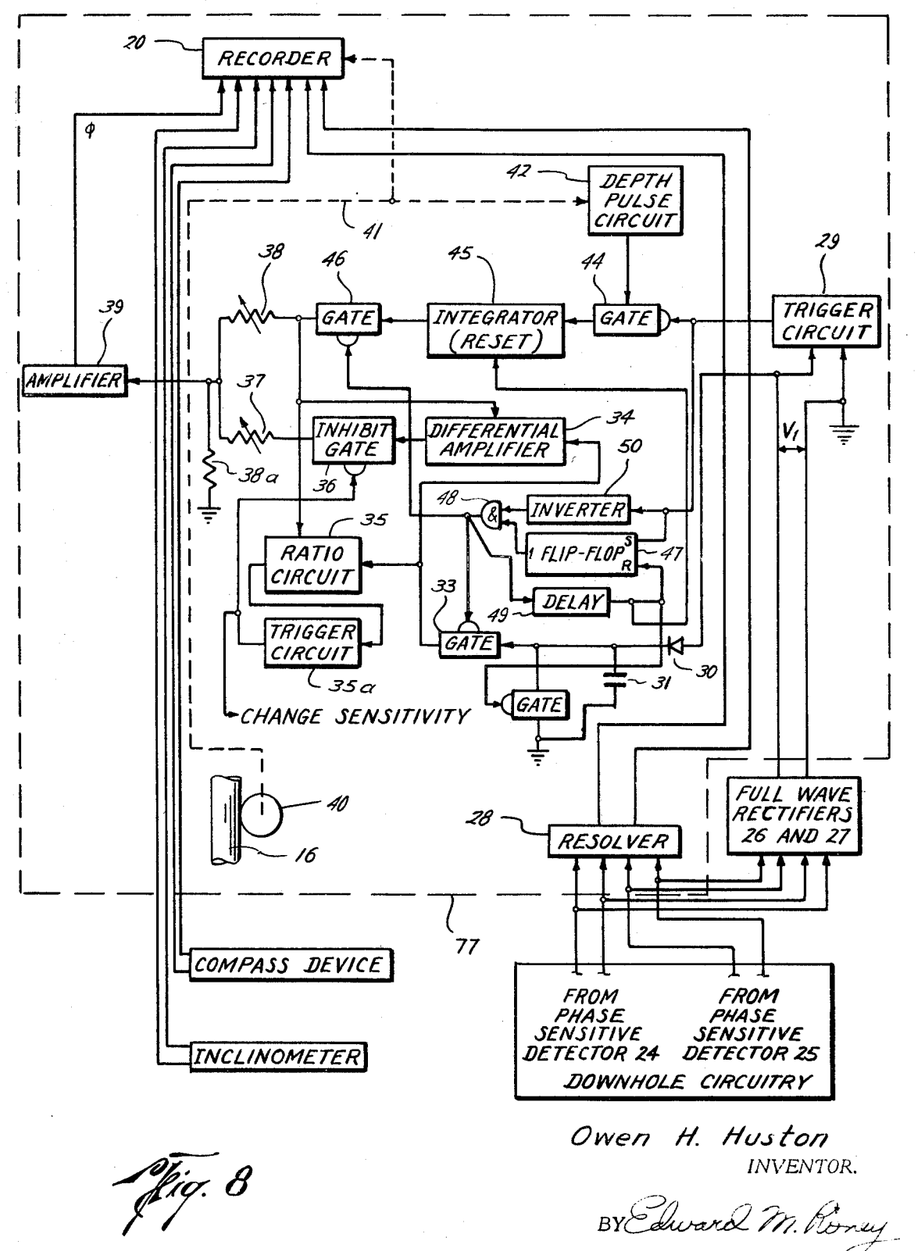
FIG. 8 illustrates schematically another embodiment of electrical circuitry that may be utilized with the present invention.

Now concerning the operation of the apparatus of FIG. 8, the peak amplitude of the output signal $V_1$ and the duration of the signal $V_1$ with respect to depth are combined to arrive at a more accurate indication of the angle of dip $\phi$. Trigger circuit 29 will provide an output signal whenever $V_1$ exceeds a given threshold level. This threshold level should be as low as possible but above the expected noise level. The output signal from trigger circuit 29 opens gate 44 and allows the pulses from depth pulse circuit 42 to pass through to integrator 45. The output of integrator 45 is an analog signal proportional to the number of pulses which have passed through gate 44 during the time when gate 44 is open, thus proportional to the length of travel of the support member 13 in the borehole during this time.

The output from trigger circuit 29 also triggers the set input of flip-flop 47 causing an output signal to be supplied to AND gate 48 during the time when trigger circuit 29 is energized. AND gate 48 will not yet be energized since the output from inverter 50 is zero at this time. During this time when trigger circuit 29 is energized, capacitor 31 will be charging up as $V_1$ increases. The output impedance from phase-sensitive detectors 24 and 25 are set such that capacitor 31 will be able to accurately follow any wave shape that $V_1$ may have. After $V_1$ reaches its maximum level, and begins decreasing, capacitor will hold the maximum voltage encountered at the peak of the wave shape because of the infinite discharge resistance to capacitor 31, gate 33 being closed at this time.

Now, when $V_1$ drops below the desired threshold value of trigger circuit 29, the output of trigger circuit 29 goes to zero, thus causing the output from inverter 50 to be "one." Since both inputs to AND gate 48 are now "one," AND gate 48 becomes energized, opening gates 33 and 46. The output from gate circuit 46 is an analog signal proportional to the depth duration of $V_1$ and the output from gate circuit 33 is an analog signal proportional to the peak amplitude of $V_1$. To obtain the dip angle $\phi$, the peak amplitude $V_1$ should be combined with the depth interval $V_1$ in a certain relationship. Assuming that all conditions in the earth formation (conductivity of fluid in fracture, etc.) remain the same, and the angle of dip $\phi$ varies, plots of dip angle $\phi$ versus peak amplitude and depth duration of $V_1$ can be obtained for the particular configuration (coil spacing, etc.) utilized. The dip angle $\phi$ could be separately determined from peak amplitude and depth duration of $V_1$ and then averaged. However, the depth duration of $V_1$ gives a more accurate indication of the dip angle $\phi$. Thus, it would be desirable to vary the indication of dip angle $\phi$ obtained from the depth duration of $V_1$ in accordance with the peak amplitude of $V_1$. If the conditions in the earth formation remain constant, the dip angle indicated from peak amplitude and depth duration can be made to be constant. Now, assuming that the fracture under investigation has salt water, thus producing a very high peak amplitude of $V_1$, the depth duration will be somewhat greater. Thus, some portion of the amount that the peak amplitude signal from gate 33 exceeds the depth duration signal from gate 46 should be subtracted from the depth duration signal to obtain a more accurate representation of dip angle $\phi$. Likewise, if the fracture contains oil, the peak value of $V_1$ will be less and some portion of the amount that the depth duration signal exceeds the peak amplitude signal should be added to the depth duration determination of the dip angle $\phi$.

Thus the output signal from gate 33 is subtracted from the output signal from gate 46 by differential amplifier 34 to obtain a correction signal. The depth duration signal and the correction signal are combined in variable resistors 37 and 38, and a voltage is developed across resistor 38a proportional to the true value of $\phi$. The values of resistors 37 and 38 are dependent on certain factors such as for example, the coil spacing, the number of terms of each coils, etc. These values of variable resistors 37 and 38 can easily be determined by experimentation once the design of the tool is known, i.e. once the coil spacing, etc. is known. The computed value of $\phi$ is then supplied through amplifier 39 to recorder 20. To reference this computed value of $\phi$ to gravitational axis, the recorded deviation angle from inclinometer 18a can be added to this computed value of dip angle $\phi$. If desired, this could be done automatically in a summing network. By utilizing resistors as shown in FIG. 8, a straight line approximation is obtained. If desired, function formers could be utilized to give a more accurate indication of the dip angle $\phi$.

The output from AND gate 48 also energizes delay circuit 49, which after a given period of delay resets flip-flop 47, integrator 45, and opens gate 32 to discharge capacitor 31 in readiness for another signal. When flip-flop 47 is reset, AND gate 48 is de-energized. Thus, the value of the dip angle $\phi$ which is supplied to recorder 20 will take the form of a pulse that is applied when the voltage $V_1$ drops below the threshold of trigger circuit 29 and whose duration is determined by the delay circuit 49, and whose amplitude is proportional to the dip angle $\phi$. Referring back to FIG. 7a, the value of the peak amplitude $V_1$ will reach a maximum value at some angle less than 90° and then start decreasing. When the peak amplitude of $V_1$ begins decreasing with angle of dip $\phi$, the resistor network 37 and 38 will no longer provide an accurate representation of the angle of dip $\phi$. The depth duration continues increasing with the angle $\phi$ until it approaches 90°. Thus, the ratio between the depth duration signal and the peak amplitude signal will become very large when the angle of dip $\phi$ reaches the angle at which the peak value of $V_1$ starts decreasing. This fact is used to alter the computing circuitry when the dip angle $\phi$ is greater than the value at which the peak amplitude of $V_1$ begins decreasing.

To accomplish this, the ratio circuit 35 takes the ratio between the depth interval signal and the peak amplitude signal and provides an output signal to trigger circuit 35a. The threshold level of trigger circuit 35a is set such as to provide an output signal when the ratio of the two applied input signals becomes great enough as to indicate that the dip angle is above the value at which the peak amplitude signal starts decreasing. This output from trigger circuit 35a inhibits the peak amplitude signal from gate 33, from being applied to the resistor networks 37–38. This signal from trigger circuit 35a also changes the circuit sensitivity to account for the fact that the peak value of $V_1$ is not being combined with the depth interval of $V_1$. This sensitivity change could, for example, comprise a change in the gain of amplifier 39, a change in the value of resistor 38 or resistor 38a, a change in the recorder 20 sensitivity, etc.

It can thus be seen that the apparatus of FIG. 8 automatically computes the desired information as to the azimuth and dip of dipping earth formations. If desired, the azimuth $\theta$ could be combined with the reading from compass device 18 and the dip angle $\phi$ could be combined with the reading from the inclinometer 18a to automatically reference $\theta$ and $\phi$ to a given compass direction and the gravitational axis. Suitable gating circuits could be employed to compute the azimuth $\theta$ only when the output voltage $V_1$ from rectifiers 26 and 27 is a maximum to provide one indication only when the sensitivity is the greatest, and likewise to combine the angle of deviation from inclinometer 18a with $\phi$ only when $\phi$ is being gated to recorder 20 so as to provide one signal.

While there have been described what are at present considered to be preferred embodiments in this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for investigating earth formations traversed by a borehole comprising:
    (a) a support member adapted for movement through the borehole and having a coil array mounted thereon, the coil array including:
        (1) at least one transmitting coil; and
        (2) two receiving coils, said two receiving coils aligned at different angles to each other and perpendicular to all transmitting coils which tend to contribute any significant amount to any voltage at a given frequency induced into said receiving coils;
    (b) means for supplying current at said given frequency to said at least one transmitting coil for inducting secondary current flow in the earth formations, the receiving coils adapted to be responsive to the secondary current flow;
    (c) detecting means individually coupled to the receiving coils for providing output signals representative of the response of the two receiving coils to the secondary current flow at said given frequency; and
    (d) means for combining said two output signals to provide a signal which is representative of the dip of formations adjoining a borehole.

2. Apparatus for investigating earth formations traversed by a borehole comprising:
    (a) a longitudinal extending support member adapted for movement through the borehole and having a coil array mounted thereon, the coil array including:
        (1) at least one transmitting coil whose axis is aligned parallel to the longitudinal axis of the support member; and
        (2) two receiving coils, said two receiving coils aligned at different angles to each other and perpendicular to all transmitting coils which tend to contribute any significant amount to any voltage at a given frequency induced into said receiving coils;
    (b) means for supplying current at said given frequency to said at least one transmitting coil for inducing secondary current flow in the earth formations, the receiving coils adapted to be responsive to the secondary current flow;
    (c) means coupled to said at least one receiving coil for providing a first signal representative of a first azimuthal component of earth formations having dip angles other than horizontal or vertical with the axis of the support member;
    (d) means coupled to the second receiving coil for providing a second signal representative for a second azimuthal component of earth formations having dip angles other than horizontal or vertical with the axis of the support member; and
    (e) means for combining the first and second signals to obtain a first output signal representative of the dip angle of the dipping earth formation.

3. The apparatus of claim 2 and further including means for combining the first and second signals to obtain a second output signal representative of the azimuth of the dipping earth formation.

4. Apparatus for investigating earth formations traversed by a borehole, comprising:
    (a) a support member adapted for movement through the borehole having a coil array mounted thereon, the coil array including:
        (1) at least two transmitting coils aligned along the same axis; and
        (2) at least two receiving coils aligned at different angles to each other and perpenditcular to the axis of said at least two transmitting coils, at least one of said transmitting coils, located above said at least two receiving coils and at least one of said transmitting coils located below said at least two receiving coils;
(b) means for supplying current to said at least two transmitting coils for inducing secondary current flow in the earth formations, said at least one receiving coil adapted to be responsive to the secondary current flow; and
(c) means coupled to said at least one receiving coil for providing an indication of a characteristic of the earth formations.

5. The apparatus of claim 4 wherein said at least two receiving coils are aligned perpendicular to the transmitting coils and perpendicular with respect to each other.

6. The apparatus of claim 4 wherein the transmitting coils are connected in a series aiding relationship.

7. The apparatus of claim 4 wherein the coil array further includes at least two focusing coils aligned along the same axis as the transmitting coils and located externally of the transmitting coils from said at least two receiving coils, the current supplying means also supplying current to the focusing coils.

8. The apparatus of claim 4 wherein the transmitting coils are connected in a series opposing relationship.

9. The apparatus of claim 2 wherein said at least one transmitting coil comprises two transmitting coils aligned along the same axis as the support member.

10. Apparatus for investigating earth formations traversed by a borehole, comprising:
(a) a support member adapted for movement through the borehole and having a coil array mounted thereon, the coil array including:
    (1) at least one transmitting coil; and
    (2) at least one receiving coil whose axis is aligned perpendicular to the axis of said at least one transmitting coil;
(b) means for supplying current to said at least one transmitting coil for inducing secondary current flow in the earth formations while said support member is moved over a selected depth interval, said at least one receiving coil adapted to be responsive to the secondary current flow;
(c) means coupled to said at least one receiving coil for providing an output signal indicative of the secondary current flow; and
(d) means for measuring the lapsed borehole depth interval that the output signal is greater than a given amplitude level to enable an indication of the dip of the earth formations to be obtained, said elapsed depth interval being functionally related to the dip of earth formations adjoining a borehole.

11. Apparatus for investigating earth formations traversed by a borehole, comprising:
(a) a support member adapted for movement through the borehole and having a coil array mounted thereon, the coil array including:
    (1) at least one transmitting coil; and
    (2) at least one receiving coil whose axis is aligned perpendicular to the axis of said at least one transmitting coil;
(b) means for supplying current to said at least one transmitting coil for inducing secondary current flow in the earth formations while said support member is moved over a selected depth interval, said at least one receiving coil adapted to be responsive to the secondary current flow;
(c) means coupled to said at least one receiving coil for providing an output signal indicative of the secondary current flow;
(d) means for measuring the elapsed depth interval that the output signal is greater than a given amplitude level and providing an elapsed depth interval signal representative thereof;
(e) means for measuring the amplitude of the output signal over said elapsed depth interval and providing an amplitude signal representative thereof; and
(f) means for combining said amplitude signal with said elapsed depth interval signal to produce a new signal representative of the dip of earth formations adjoining a borehole.

12. The apparatus of claim 11 wherein said at least one transmitting coil comprises at least two transmitting coils located above and below said at least one receiving coil.

13. The apparatus of claim 12 wherein said at least one receiving coil comprises two receiving coils aligned perpendicular to each other and perpendicular to the transmitting coils.

14. The apparatus of claim 12 wherein the coil array further includes at least two focusing coils aligned along the same axis as the transmitting coils and located externally of the transmitting coils with respect to said at least one receiving coil, the current supplying means also supplying current to the focusing coils so as to focus the secondary current flow from the transmitting coils into a desired flow pattern.

15. Apparatus for investigating earth formations traversed by a borehole, comprising:
(a) a support member adapted for movement through the borehole and having a coil array mounted thereon, the coil array including:
    (1) at least one transmitting coil; and
    (2) at least one receiving coil whose axis is aligned perpendicular to the axis of said at least one transmitting coil;
(b) means for supplying current to said at least one transmitting coil for inducing secondary current flow in the earth formations while said support member is moved over a selected depth interval, said at least one receiving coil adapted to be responsive to the secondary current flow;
(c) means coupled to said at least one receiving coil for providing an output signal indicative of the secondary current flow;
(d) means responsive to the output signal for generating a depth interval signal indicative of the elapsed depth interval that the output signal is above a given amplitude;
(e) means responsive to the output signal for generating a peak amplitude signal indicative of the peak amplitude of the output signal over the elapsed depth interval; and
(f) means for combining the peak amplitude signal and the depth interval signal in a given relationship to obtain a signal indicative of the earth formation dip angle.

16. The apparatus of claim 15 wherein the means for combining the peak amplitude signal and the depth interval signal includes:
(1) means for measuring the difference between the peak amplitude signal and the depth interval signal; and
(2) means for combining the measured difference and the depth interval signal in a given relationship to obtain the signal indicative of the dip of the earth formations.

17. The apparatus of claim 15 wherein the means for combining the peak amplitude signal and the depth interval signal includes:
(1) means responsive to a relationship between the peak amplitude signal and the depth interval signal for providing a control signal when the angle of dip is greater than the angle which provides a maximum peak amplitude signal; and
(2) means responsive to the control signal for changing the given relationship with which the peak amplitude signal and the depth interval signal are combined.

18. A method of investigating earth formations traversed by a borehole, comprising:

(a) moving a support member having a coil array mounted thereon through the borehole, the coil array including:
  (1) at least one transmitting coil; and
  (2) at least one receiving coil whose axis is aligned perpendicular to the axis of said at least one transmitting coil;
(b) supplying current to said at least one transmitting coil for inducing secondary current flow in the earth formations, said at least one receiving coil adapted to be responsive to the secondary current flow;
(c) generating an output signal indicative of the secondary current flow in response to the signal induced into said at least one receiving coil; and
(d) measuring the elapsed depth interval over which the output signal is greater than a given amplitude level to enable an indication of the dip of earth formations adjoining a borehole to be obtained, said elapsed depth interval being functionally related to said dip.

19. A method of investigating earth formations traversed by a borehole, comprising:
(a) moving a support member having a coil array mounted thereon through the borehole, the coil array including:
  (1) at least one transmitting coil; and
  (2) at least one receiving coil whose axis is aligned perpendicular to the axis of said at least one transmitting coil;
(b) supplying current to said at least one transmitting coil for inducing secondary current flow in the earth formations, said at least one receiving coil adapted to be responsive to the secondary current flow;
(c) generating an output signal indicative of the secondary current flow in response to the signal induced into said at least one receiving coil;
(d) measuring the elapsed depth interval over which the output signal is greater than a given amplitude;
(e) measuring the amplitude of the output signal over the elapsed depth interval; and
(f) combining the elapsed depth interval and amplitude measurements to produce an indication of the dip of earth formations adjoining a borehole.

20. The method of claim 19 wherein said at least one receiving coil comprises two receiving coils aligned perpendicular to each other and the step of generating an output signal includes:
(1) generating a first signal in response to the signal induced into a first one of the receiving coils;
(2) generating a second signal in response to the signal induced into the second receiving coil; and
(3) generating the output signal in response to the first and second signals, and further including combining the first and second signals to obtain the azimuth of dipping earth formations.

21. A method of investigating earth formations traversed by a borehole, comprising:
(a) moving a support member having a coil array mounted thereon through the borehole, the coil array including:
  (1) at least one transmitting coil; and
  (2) at least one receiving coil whose axis is aligned perpendicular to the axis of said at least one transmitting coil;
(b) supplying current to said at least one transmitting coil for inducing secondary curernt flow in the earth formations, said at least one receiving coil adapted to be responsive to the secondary current flow;
(c) generating an output signal indicative of the secondary current flow in response to the signal induced into said at least one receiving coil;
(d) measuring the elapsed depth interval over which the output signal is greater than a given amplitude;
(e) measuring the peak amplitude of the output signal over the elapsed depth interval; and
(f) combining the elapsed depth interval and peak amplitude measurements to produce an indication of the dip of earth formations adjoining a borehole.

22. The method of claim 21 and further including:
(4) generating a control signal in response to a given relationship between the peak amplitude and depth duration measurements, said control signal being generated when the angle of dip is greater than the angle which provides a maximum peak amplitude measurement; and
(5) altering the relationship by which the peak amplitude and depth duration measurements are combined in response to the control signal.

References Cited

UNITED STATES PATENTS

| | | | |
|---|---|---|---|
| 2,721,970 | 10/1955 | Levinthal | 324—0.5 |
| 3,128,425 | 4/1964 | Codrington | 324—0.5 |
| 3,179,878 | 4/1965 | Schwede | 324—0.5 |
| 3,395,341 | 7/1968 | Malaquin | 324—41 XR |
| 2,264,318 | 12/1941 | Lee | 324—6 |
| 2,582,314 | 1/1952 | Doll | 324—6 |
| 2,723,374 | 11/1955 | Williams | 324—6 |
| 2,987,668 | 6/1961 | Gondouin | 324—6 |
| 3,014,177 | 12/1961 | Hungerford et al. | 324—8 |
| 3,052,837 | 9/1962 | Arbogast et al. | 324—6 XR |
| 3,187,252 | 6/1965 | Hungerford | 324—6 |
| 3,305,771 | 2/1967 | Arps | 324—6 |

FOREIGN PATENTS 145,940  7/1962  U.S.S.R.

GERALD R. STRECKER, Primary Examiner